(12) United States Patent
Yoshikawa

(10) Patent No.: US 8,226,304 B2
(45) Date of Patent: Jul. 24, 2012

(54) OPTICAL TRANSCEIVER WITH PARTITION PLATE BETWEEN TOSA AND ROSA

(75) Inventor: Satoshi Yoshikawa, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 292 days.

(21) Appl. No.: 12/651,607

(22) Filed: Jan. 4, 2010

(65) Prior Publication Data

US 2010/0178013 A1    Jul. 15, 2010

(30) Foreign Application Priority Data

Jan. 9, 2009 (JP) ................... 2009-003401

(51) Int. Cl.
*G02B 6/36* (2006.01)
*H01R 13/648* (2006.01)

(52) U.S. Cl. ............. 385/92; 385/88; 385/89; 439/76.1; 439/607.2; 439/607.23; 439/607.24

(58) Field of Classification Search .................... 385/88, 385/89, 92; 439/76.1, 607.2, 607.23, 607.24
See application file for complete search history.

(56) References Cited

U.S. PATENT DOCUMENTS

| 6,335,869 | B1* | 1/2002 | Branch et al. ................. 361/816 |
| 6,499,890 | B2* | 12/2002 | Gilliland et al. ................ 385/88 |
| 6,817,782 | B2* | 11/2004 | Togami et al. .................. 385/92 |
| 6,935,882 | B2* | 8/2005 | Hanley et al. ................ 439/372 |
| 7,121,742 | B2* | 10/2006 | Oki ................................ 385/92 |
| 7,125,261 | B2 | 10/2006 | Yoshikawa et al. |
| 7,406,230 | B2 | 7/2008 | Yoshikawa |
| 7,416,353 | B2 | 8/2008 | Yoshikawa et al. |
| 2001/0024551 | A1* | 9/2001 | Yonemura et al. .............. 385/88 |
| 2004/0208459 | A1* | 10/2004 | Mizue et al. .................... 385/92 |
| 2006/0093287 | A1* | 5/2006 | Yoshikawa et al. ............. 385/92 |

* cited by examiner

*Primary Examiner* — Ryan Lepisto
(74) *Attorney, Agent, or Firm* — Venable LLP; Michael A. Sartori; Leigh D. Thelen

(57) ABSTRACT

An SFP transceiver with two subassemblies each having an optical coupling member with a polygonal cross section is disclosed. The polygonal cross section has a flat surface facing the flat surface of the other subassembly. Between flat surfaces is put with a metal partition plate that comes in contact with a metal frame and a metal cover of the transceiver. Two sub-assemblies are electrically shielded by the partition plate, and the polygonal cross section of the subassembly makes the total width of the two assemblies added with the thickness of the partition plate minimum.

8 Claims, 12 Drawing Sheets

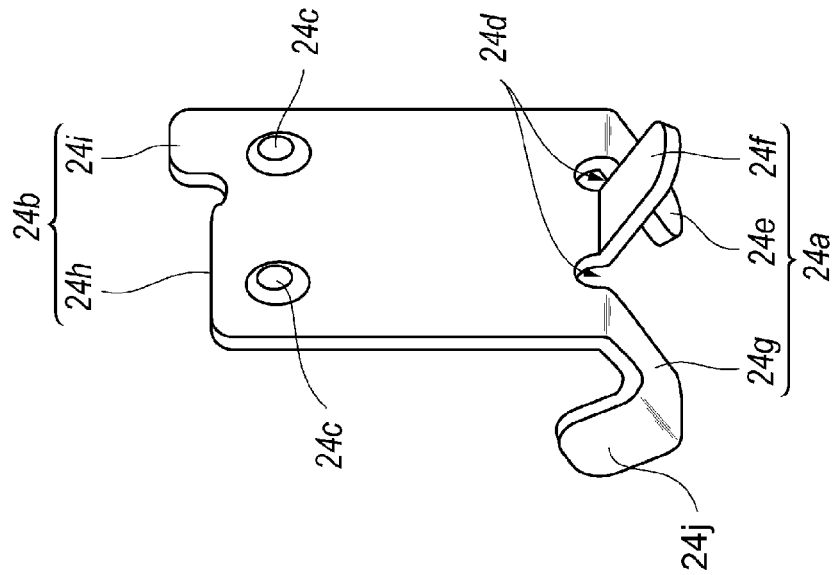
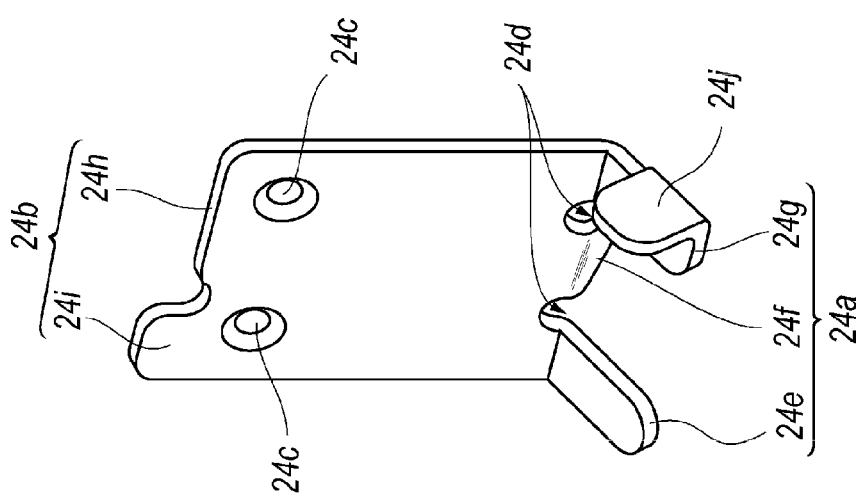
Fig. 9B
Fig. 9A

OPTICAL TRANSCEIVER WITH PARTITION PLATE BETWEEN TOSA AND ROSA

CROSS REFERENCE TO PRIOR APPLICATIONS

The present invention closely relates to the following U.S. patent application Ser. No. 11/242,143, entitled: OPTICAL TRANSCEIVER WITH A PLUGGABLE FUNCTION, now issued as U.S. Pat. No. 7,125,261; Ser. No. 11/656,003, entitled: OPTICAL TRANSCEIVER WITH A PLUGGABLE FUNCTION, now U.S. Pat. No. 7,406,230; and Ser. No. 11/242,148, entitled: HEAT DISSIPATING MECHANISM OF A PLUGGABLE OPTICAL TRANSCEIVER, now U.S. Pat. No. 7,416,353; all incorporated herein as references.

BACKGROUND OF THE INVENTION

1. Field of the Invention

The present invention relates to an optical transceiver that provides a partition plate between a transmitter optical subassembly (hereafter denoted as TOSA) and a receiver optical subassembly (hereafter denoted as ROSA).

2. Related Prior Art

The inventor of the present invention has already disclosed a type of the pluggable optical transceiver called as the small form factor pluggable (SFP) transceiver. The TOSA and the ROSA installed in the SFP transceiver generally have an optical device with a CAN package and an optical coupling member continuous to the top end of the optical device. The optical coupling member generally comprises a plurality of components each having a cylindrical shape. Thus, the TOSA and the ROSA with the CAN package and such a coupling member generally have, what is called, the co-axial shape.

Continuous requests to reduce the cost or the price of the optical transceiver are reflected in a resin made optical coupling member. There's something required to compensate for the lost stiffness in the replacement of a metal component with a resin made component. Moreover, the metal package inherently provides a shielding effect for the electromagnetic interference (EMI) radiation; while, the resin made component is inevitably defenseless against the EMI noise.

The specifications of the SFP transceiver, in particular, the outer dimensions and the fundamental electronic performances such as the power consumption and the pin assigns, are defined by the multi-source agreement (MSA). The full width of the SFP transceiver is thus determined by the MSA. Accordingly, even when the resin made package has lesser stiffness compared to the metal package and the thicker wall may compensate this lesser stiffness, the wall thickness of the resin made package has a restriction derived from the limitation of the MSA standard. Moreover, at least a shield member is necessary to be put between two subassemblies, but this increases the full width of the transceiver.

SUMMARY OF THE INVENTION

One aspect of the present invention relates to an optical transceiver that provides a TOSA, a ROSA and a partition plate. The TOSA and the ROSA have an optical device and an optical coupling member. The optical coupling member, which is made of resin, receives the optical device and has a polygonal cross section having at least a pair of flat surfaces extending substantially in parallel. The TOSA and the ROSA are arranged in side-by-side configuration such that one of the flat surfaces of the TOSA faces one of the flat surfaces of the ROSA as putting the partition plate therebetween. The optical transceiver according to the present invention has a feature that a sum of the distance between the flat surfaces of the TOSA, that of the ROSA, and thickness of the partition plate is substantially equal to or slightly smaller than a width of the optical transceiver.

The TOSA and the ROSA each includes an optical coupling member made of resin with the polygonal cross section and a bore in a center portion thereof. This coupling portion has a thickness in portion of the flat surfaces less than a thickness in portions except the flat surfaces. Thus, the optical transceiver of the present invention, even if the optical coupling member is made of resin which shows less stiffness than metal, may arrange two optical subassemblies in side-by-side configuration as having the sufficient stiffness in portions except the flat surfaces.

The metal partition plate may come in physically contact with the metal ground plate assembled to the optical receptacle so as to trace the outline of the optical receptacle. The partition plate, in a portion coming in contact with the optical receptacle through the ground plate, is preferable to trace the cross section of the optical receptacle, which prevents the partition plate from misarranging back-to-front.

The metal partition plate may further come in physically contact with a metal frame that installs electronic circuits coupled with the TOSA and the ROSA. The partition plate may provide a plurality of legs bent alternately and may be in elastically contact with the metal frame.

The optical coupling member of the invention may provide a flange, a neck and a skirt that receives the optical device; while the optical receptacle may provide a saddle where the neck of the optical coupling member is set thereon as the flange and the skirt sandwiches the saddle therebetween. The width of the neck may be slightly smaller than a width of the saddle to set the optical coupling member on the saddle stably.

Another aspect of the present invention relates to a method to assemble the optical transceiver. The method comprising steps of: (1) preparing an intermediate product that includes the TOSA and the ROSA each coupled with an electronic circuit board with a flexible printed circuit board such that one the flat surface of the TOSA faces one of the flat surfaces of the ROSA; (2) inserting the partition plate between the flat surfaces facing each other; and (3) assembling the intermediate product with the partition plate with the optical receptacle such that the optical coupling portion of the TOSA and that of the ROSA are set on a predetermined position in the optical receptacle.

The method according to the present invention may prevent the TOSA and the ROSA from twisting during the assembly.

BRIEF DESCRIPTION OF THE DRAWINGS

The invention may be more completely understood in consideration of the following detailed description of various embodiments of the invention in connection with the accompanying drawings, in which:

FIGS. 6A and 6B are perspective view of an optical subassembly, in which FIG. 6A is a front view of the optical subassembly, while, FIG. 6B is a rear view thereof;

FIGS. 9A and 9B illustrate the partition plate according to an embodiment of the invention;

DETAILED DESCRIPTION OF PREFERRED EMBODIMENTS

Figure 1:
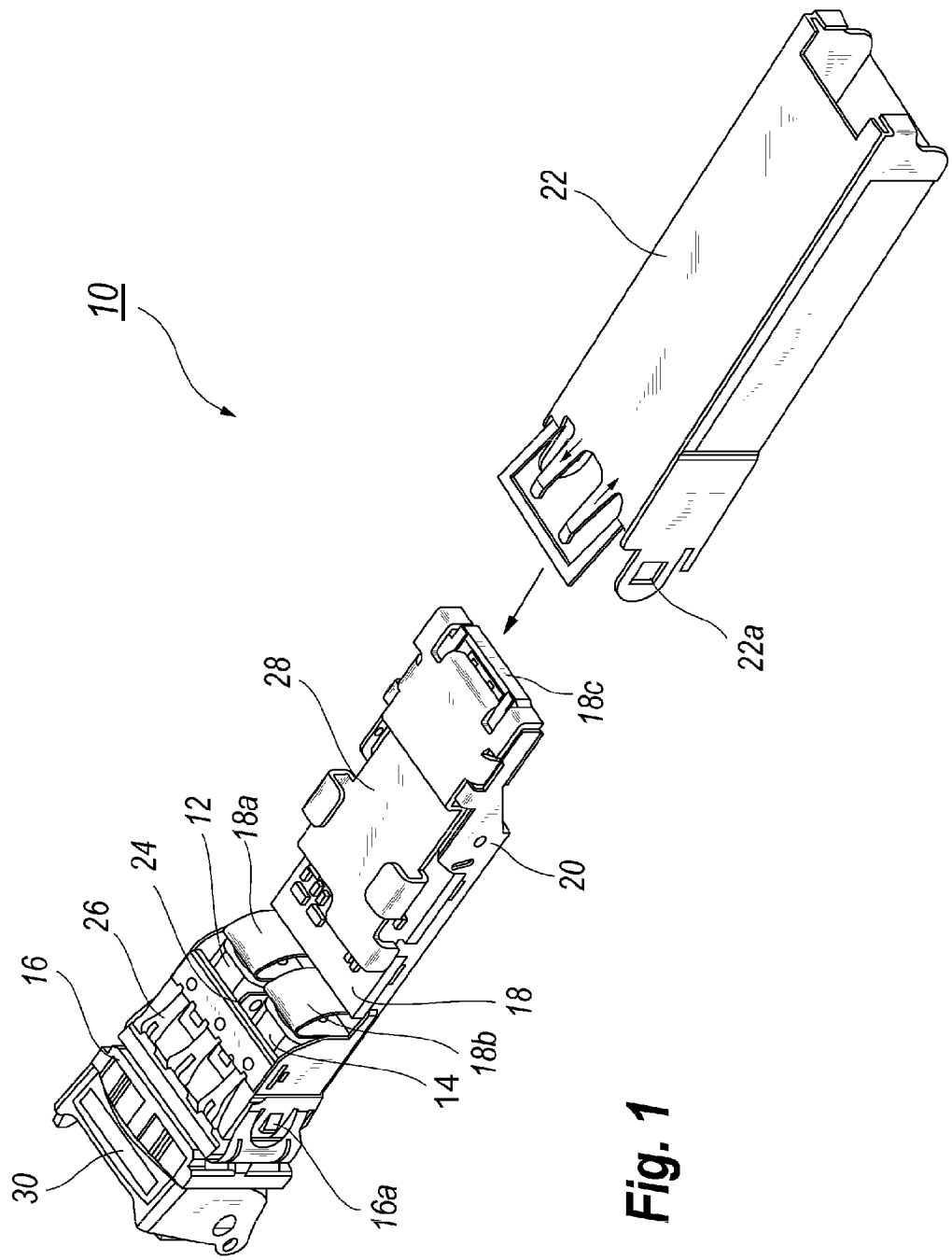
FIG. 1 is an exploded view of an optical transceiver according to an embodiment of the present invention.
Figure 2:
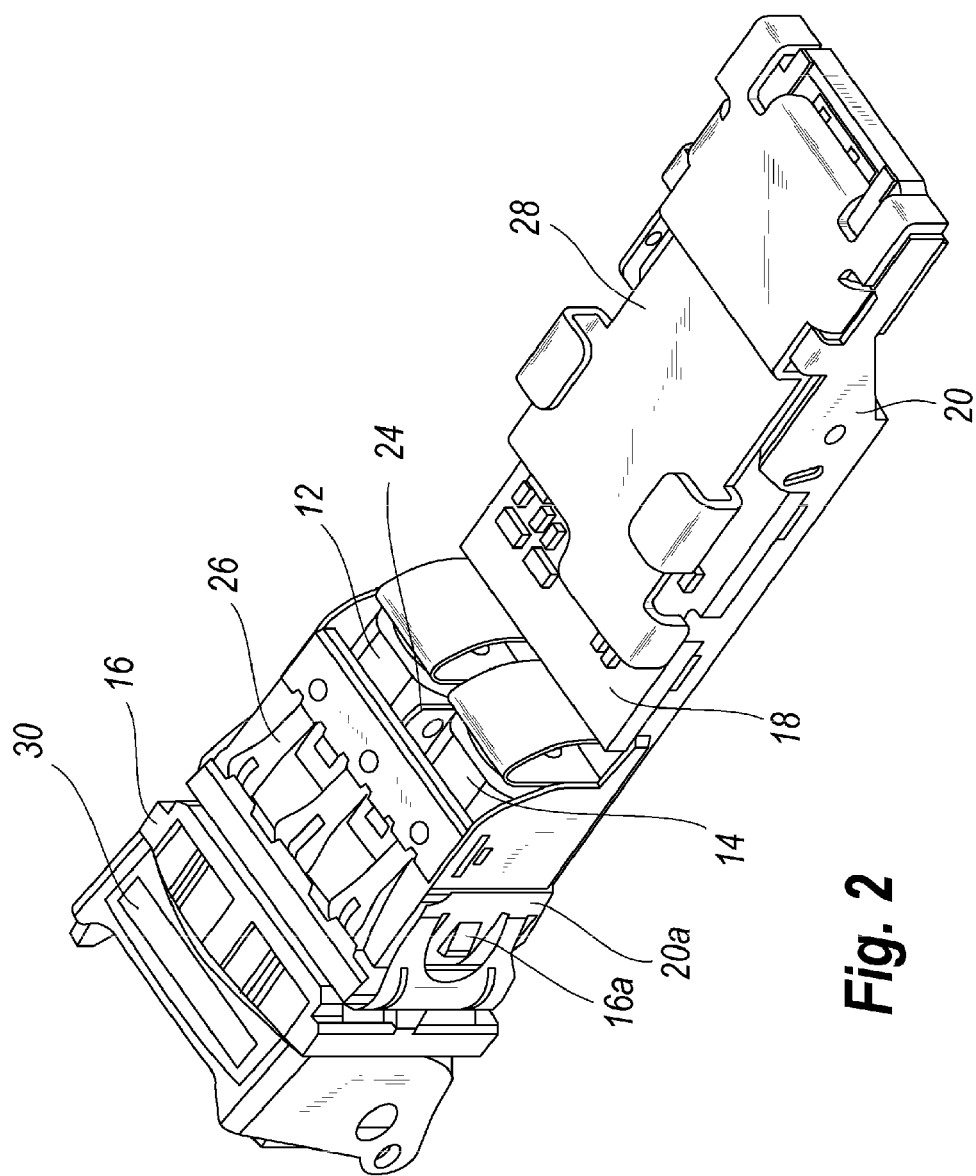
FIG. 2 illustrates an inside of the optical transceiver shown in FIG. 1, in which a cover is removed.
Figure 3:
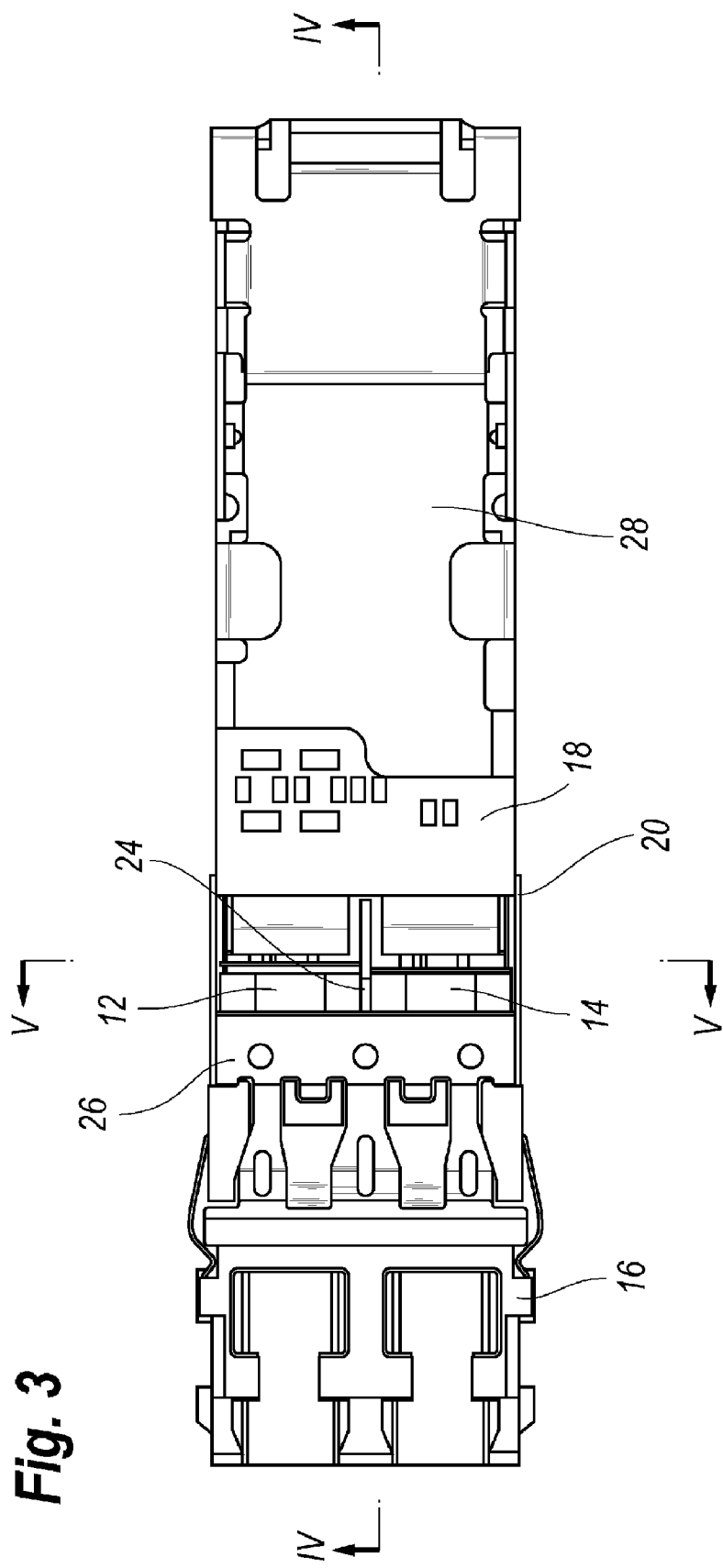
FIG. 3 is a plain view of the inside of the optical transceiver shown in FIG. 2.
Figure 4:
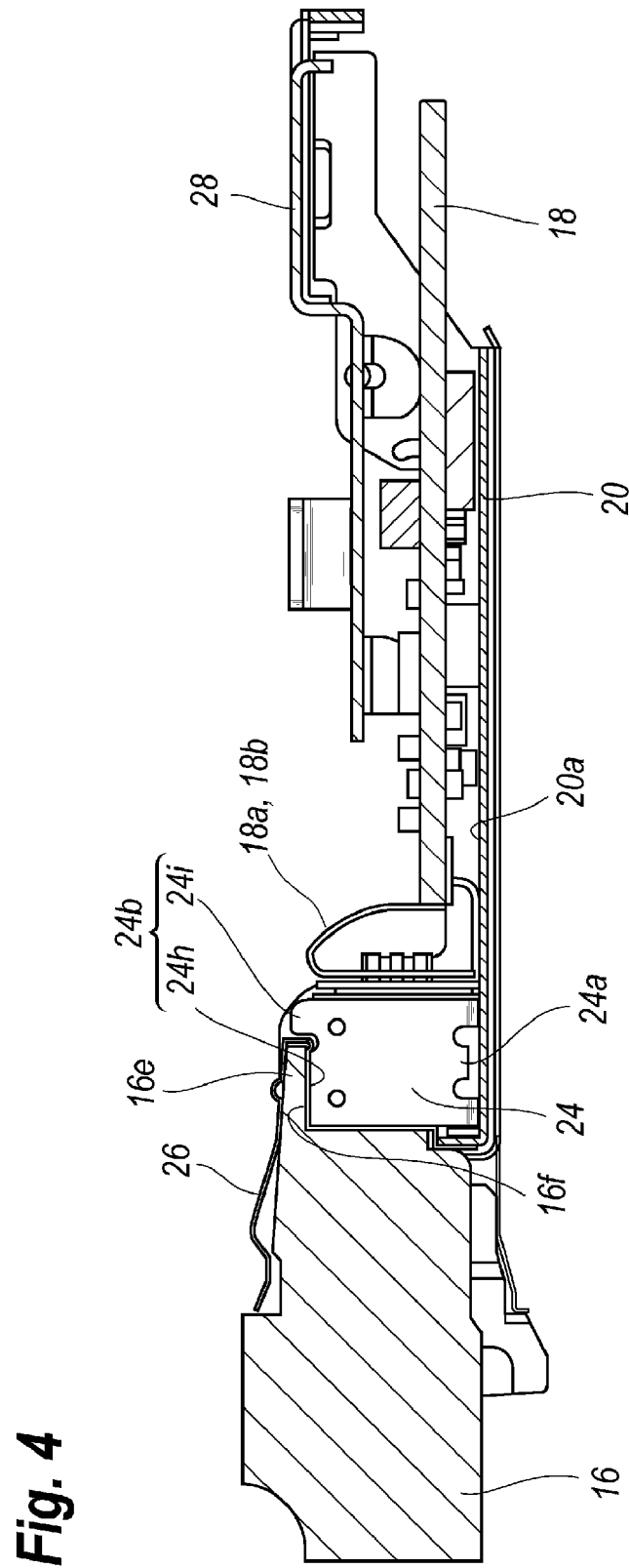
FIG. 4 is a cross section of the optical transceiver taken along the ling VI-VI in FIG. 3.
Figure 5:
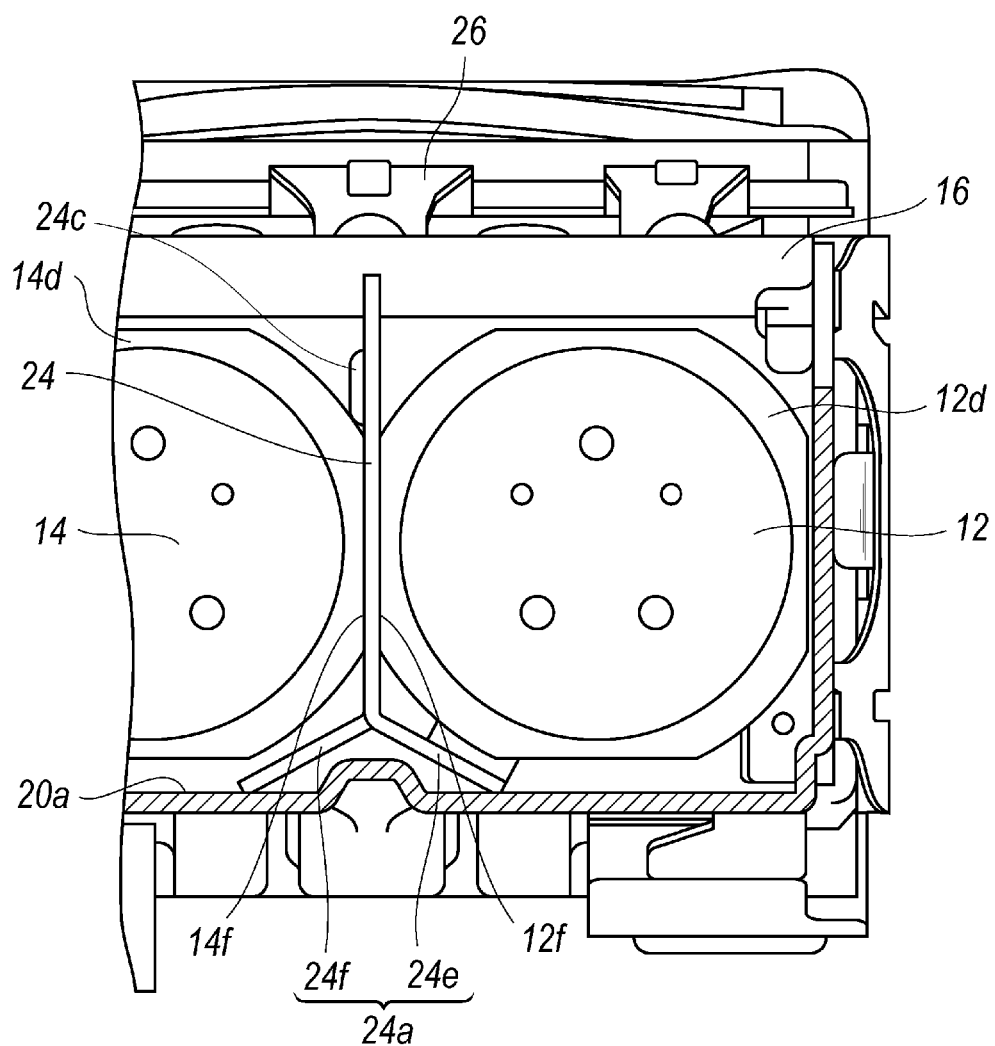
FIG. 5 is a cross section of the optical transceiver taken along the ling V-V in FIG. 3.

Next, preferred embodiments according to the present invention will be described as referring to accompanying drawings, in which FIG. 1 is an exploded view of an optical transceiver according to an embodiment of the present invention, FIG. 2 illustrates an inside of the optical transceiver shown in FIG. 1, in which a cover is removed, FIG. 3 is a plan view of the inside of the optical transceiver shown in FIG. 2, FIG. 4 is a cross section of the optical transceiver taken along the ling VI-VI in FIG. 3, and FIG. 5 is a cross section of the optical transceiver taken along the ling V-V in FIG. 3.

The optical transceiver 10 shown in FIGS. 1 to 5 comprises a TOSA 12, a ROSA 14, an optical receptacle 16, a circuit board 18, a frame 20, a cover 22 and a partition plate 24. The optical transceiver 10 may further comprise a ground finger 26, a sub-frame 28, and a bail 30. In the description below presented, the front side corresponds to a side where the optical receptacle 16 is positioned with respect to the circuit board 18, while, the rear side corresponds to an opposite side.

The TOSA 12 and the ROSA 14 each has a co-axial package. The TOSA 12 encloses a semiconductor light-emitting device, typically a laser diode (LD), to emit signal light; while, the ROSA 14 installs a semiconductor light-receiving device, typically a photodiode (PD), to receive signal light. The TOSA 12 and the ROSA 14 each provides a cylindrical coupling member extending along the optical axis. Details of the coupling member will be explained later.

The optical receptacle 16 mounts the TOSA 12 and the ROSA 14, and couples the external optical connector, which is not shown in the figures, with the TOSA 12 and the ROSA 14 in the cavity formed therein. The optical receptacle 16 may be made of resin or metal die casting. The circuit board 18 mounts electronic circuits connected to the TOSA 12 and the ROSA 14. The circuit board 18 is coupled with the TOSA 12 and the ROSA 14 in the front end thereof through the flexible printed circuit boards, 18a and 18b; while, it provides an electronic plug 18c in the rear end to couple the optical transceiver 10 with the host system.

The frame 20 installs the circuit board 18 thereon, that is, the circuit board 18 is placed between the frame 20 and the sub-frame 28. The frame 20 is formed from a metal plate only by cutting and bending without any further process of soldering or welding. The frame 20 has a bottom 20a, which is shown in FIG. 4, and a pair of side walls each having an opening. Engaging the projections 16a of the optical receptacle 16, refer to FIGS. 2 and 8, the frame 20 may be assembled with and fixed to the optical receptacle 16.

The cover 22 covers a rear portion of the optical receptacle 16, the circuit board 18, the frame 20, the sub-frame 28, and so on. The cover 22 is also formed in a rectangular cross section from a metal plate only by cutting and bending without any soldering or welding. Engaging the opening 22a formed in both sides thereof with the projection 16a of the optical receptacle 16, the cover 22 is assembled with and fixed to the optical receptacle 16.

The ground finger 26 is to come in contact with the ground of the host system, and shows a function to shield the optical transceiver 10 and the host system. The ground finger 26 is also formed from a metal plate only by cutting and bending without any welding or soldering. The ground finger 26 is arranged in a periphery of the optical receptacle 16 such that, when the optical transceiver 10 is set in the cage provided in the host system, the ground finger 26 is to come in contact with the inner surface of the cage. Thus, the ground finer 26 not only secures the ground potential of the optical transceiver 10 but shields the gap between the optical transceiver 10 and the inner surface of the cage.

The bail 30 may make a pivotal motion between the top and the bottom of the optical receptacle 16 so as to cross the front thereof. This pivotal motion of the bail 30 links the front and rear motion of the actuator provided in the bottom of the optical transceiver 10, which is not shown in the figures. The motion of the actuator disengages the optical transceiver 10 with the cage of the host system, thus, the optical transceiver 10 may be extracted from the host system.

Next, details of the TOSA 12, the ROSA 14, and the partition plate 24 will be described.

Figure 6:
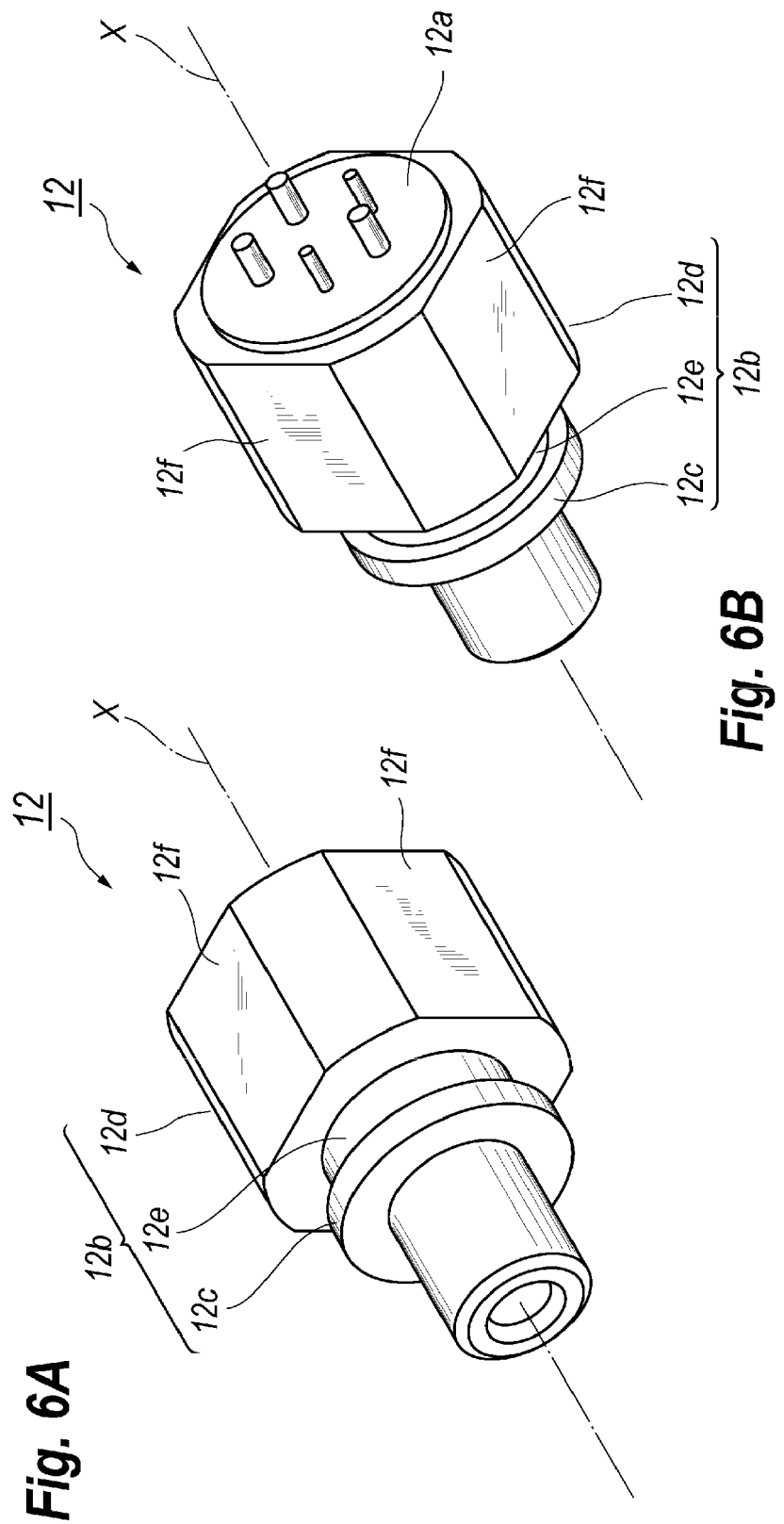

Because the ROSA 14 has a package substantially same with those of the TOSA 12, the description below will concentrate on the TOSA 12. FIGS. 6A and 6B are perspective drawings of the TOSA 12, where FIG. 6A is viewed from the front, while, FIG. 6B is viewed from the rear.

The TOSA 12 comprises the optical device 12a with the CAN package that installs the LD therein, and the coupling member 12b extending along the optical axis X of the TOSA 12 and having a cylindrical shape. In the present embodiment, the TOSA 12 is made of resin. The coupling member 12b has a flange 12c, a skirt 12d and a neck 12e between the flange 12c and the skirt 12d. The skirt 12d receives the optical device 12a in the bore formed therein. FIGS. 6A and 6B illustrate a condition where the optical device 12a is fully set within the bore in the skirt 12d. The skirt 12d has a polygonal cross section including at least a pair of flat surfaces 12f. Portions of the skirt 12d except for the flat surface have a thicker wall to secure the optical device 12a reliably.

Figure 7:
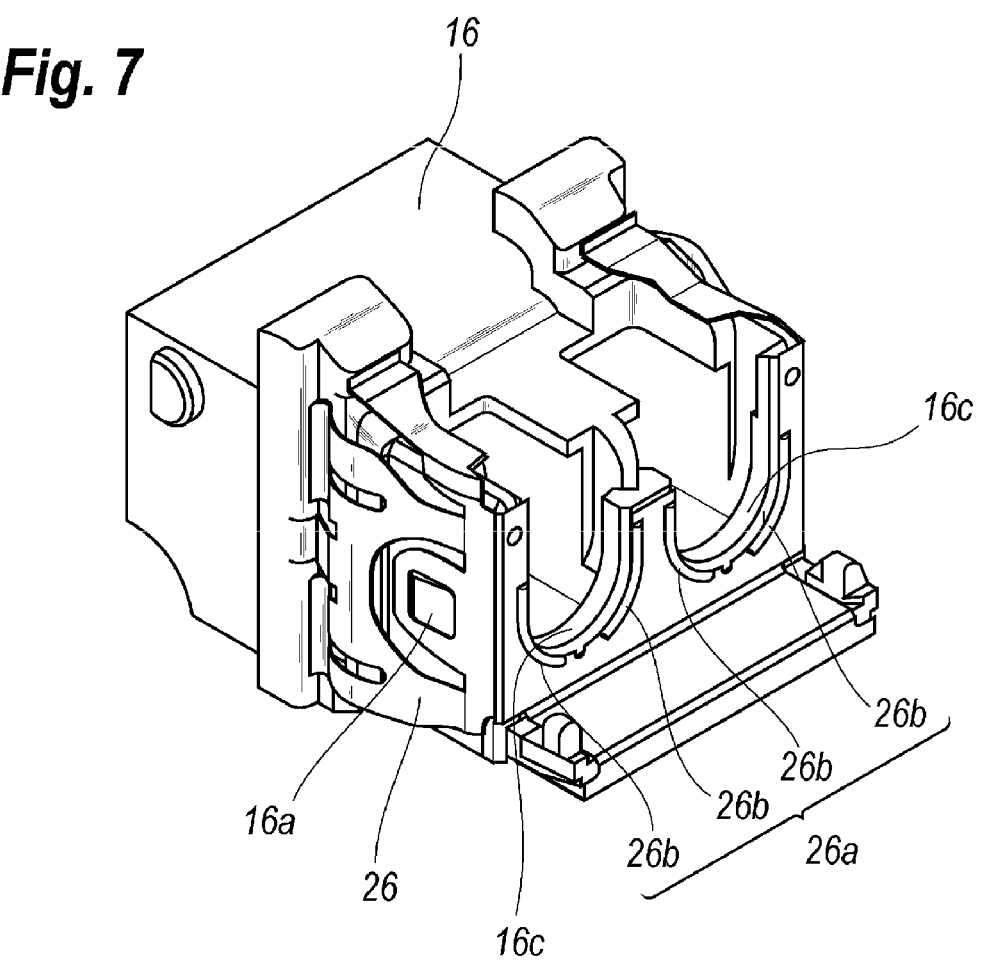
FIG. 7 is a perspective view of the optical receptacle which is assembled with the ground finger.

The TOSA 12 and the ROSA 14 are mounted in the optical receptacle 16. FIG. 7 illustrates the optical receptacle 16 assembled with the ground finger 26, while, FIG. 8 shows the optical receptacle 16 where the ground finger 26 is disassembled.

Figure 8:
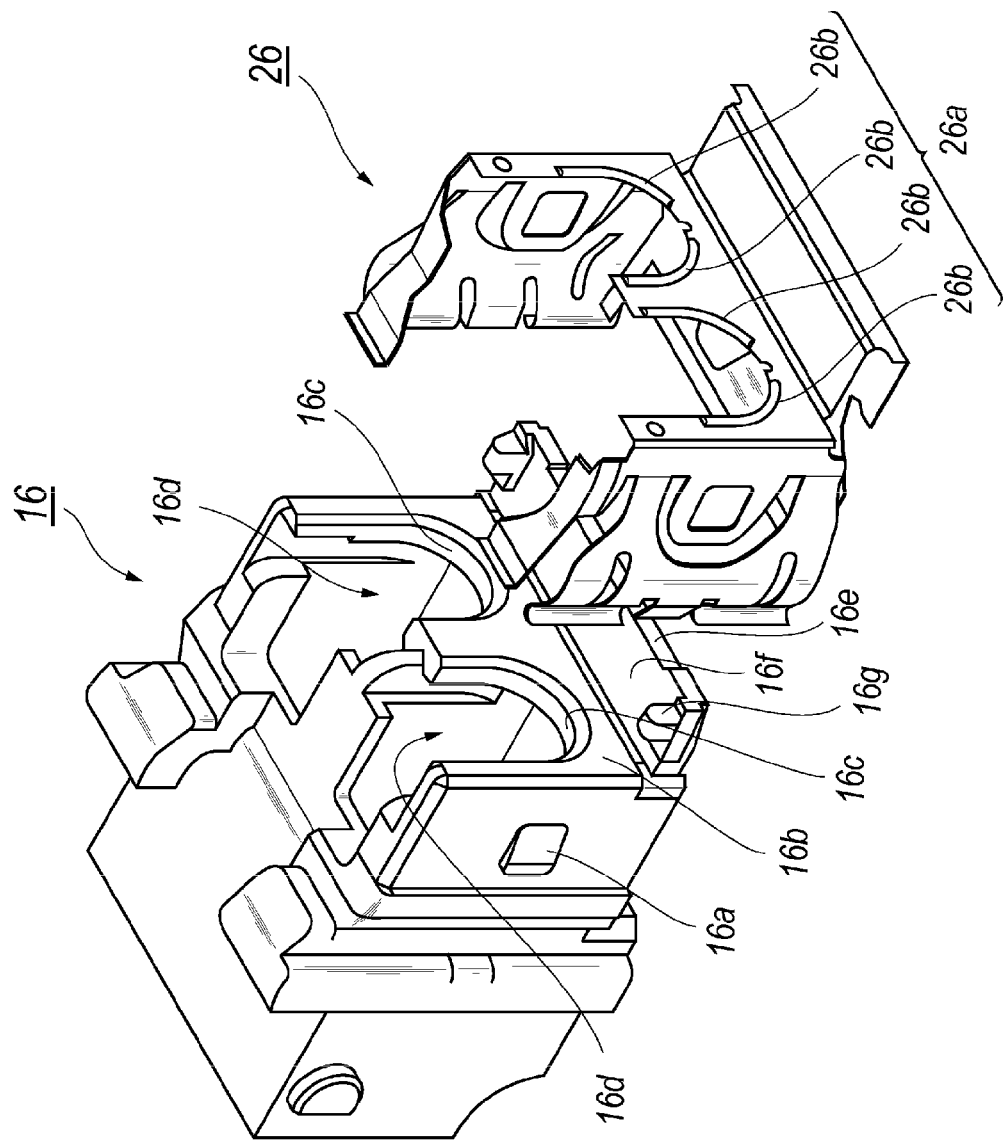
FIG. 8 shows the optical receptacle and the ground finger disassembled with the optical receptacle.

As shown in FIGS. 7 and 8, the optical receptacle 16 has the rear wall 16b substantially perpendicular to the optical axis of the TOSA 12 and that of the ROSA 14. This rear wall 16b provides two saddles 16c where the neck 12e of the TOSA 12 is set thereon. The saddle 16c has the U-shape with the cutting 16d to set the TOSA 12 on the saddles 16c. The cuttings 16d continue the inner cavity of the optical receptacle 16c where the coupling member 12 may engage with the external optical connector.

The optical receptacle 16 also has an eaves 16e extending from the rear wall 16b rearward. The surface 16f of the eaves 16e faces the bottom 20a of the frame 20. The ground finger 26 has a shape covering the sides, the rear wall 16b and the eaves 16c of the optical receptacle 16. The ground finger 26 further has two cuttings 26a that traces the U-shape of the saddle 16c of the optical receptacle 16. Thus, the cuttings 26a of the ground finger 26 continue the cuttings 16d of the optical receptacle 16. The cutting 26a provides two ribs 26b that have an arched cross section along the axis X. The rib 26b is divided into two parts with respect to the center of the U-shape cutting 26a.

Setting the neck portion 12e of the TOSA 12 onto the saddle 16c, the flange 12c and the skirt 12d of the coupling member 12b put the saddle 16c therebetween. The same arrangement is appeared in the ROSA 14. In the present embodiment, a width of the neck 12e is slightly smaller than a sum of the thickness of the saddle 16c and that of the rib 26b. Accordingly, setting the TOSA 12 on the saddle 16c, the rib 26b causes a repulsive force against the flange 12c and the skirt 12d, which makes the TOSA 12 and the ROSA 14 securely assembled with the optical receptacle 16.

The optical transceiver 10 of the present embodiment provides the partition plate 24 between the flat surface 12f of the skirt 12d of the TOSA 12 and the corresponding flat surface 14f of the ROSA 14. FIGS. 9A and 9B are perspective drawings of the partition plate each viewed from sides opposite to the others.

The partition plate 24 is also formed from a metal plate only by cutting and bending without any welding. The partition plate 24 has a leg portion 24a and a top portion 24b. The leg portion 24a is divided a few parts by slits extending from the leg portion 24a to the top portion 24b. The present embodiment provides two slits 24d and three legs, 24e to 24g. These three legs, 24e to 24g, are bent alternately in sides opposite to the other. Tips of respective legs, 24e to 24g, come in elastically contact with the bottom 20a of the frame 20 as illustrated in FIG. 5.

The top portion 24b has two edges, 24i and 24h. One of the edges 24h extends along and faces the surface 16f of the eaves 16e. When the partition plate 24 is set between the bottom 20a of the frame 20 and the eaves 16e of the optical receptacle 16, the legs, 24e to 24g, come in contact with the bottom 20a, while, the top portion 24b comes in contact with the eaves 16e through the ground finger 26. Because the legs, 24e to 24g, are bent alternately, the partition plate 24 is elastically secured between the frame 20 and the eaves 16e of the optical receptacle 16.

The top portion 24b of the partition plate 24 further has another edge 24i protruding from the other edge 24h. As illustrated in FIG. 4, this edge 24i in the side thereof faces the rear surface of the eaves 16e. Thus, the edge 24i may prevent the partition plate 24 from being oppositely set in rear to front.

The partition plate 24 further has two projections 24c. As illustrated in FIG. 5, the flat surface 14f of the skirt 12f of the ROSA 14 is set between these projections 24c and the leg portion 24a. The projection 24c operates as a stopper to prevent the partition plate 24 from slipping out until the TOSA 12 and the ROSA are assembled with the optical receptacle. Although the projection 24c protrudes toward the side of the ROSA 14 in the embodiment shown in FIG. 5, the projection 24c may stick out to the TOSA side.

Figure 11:
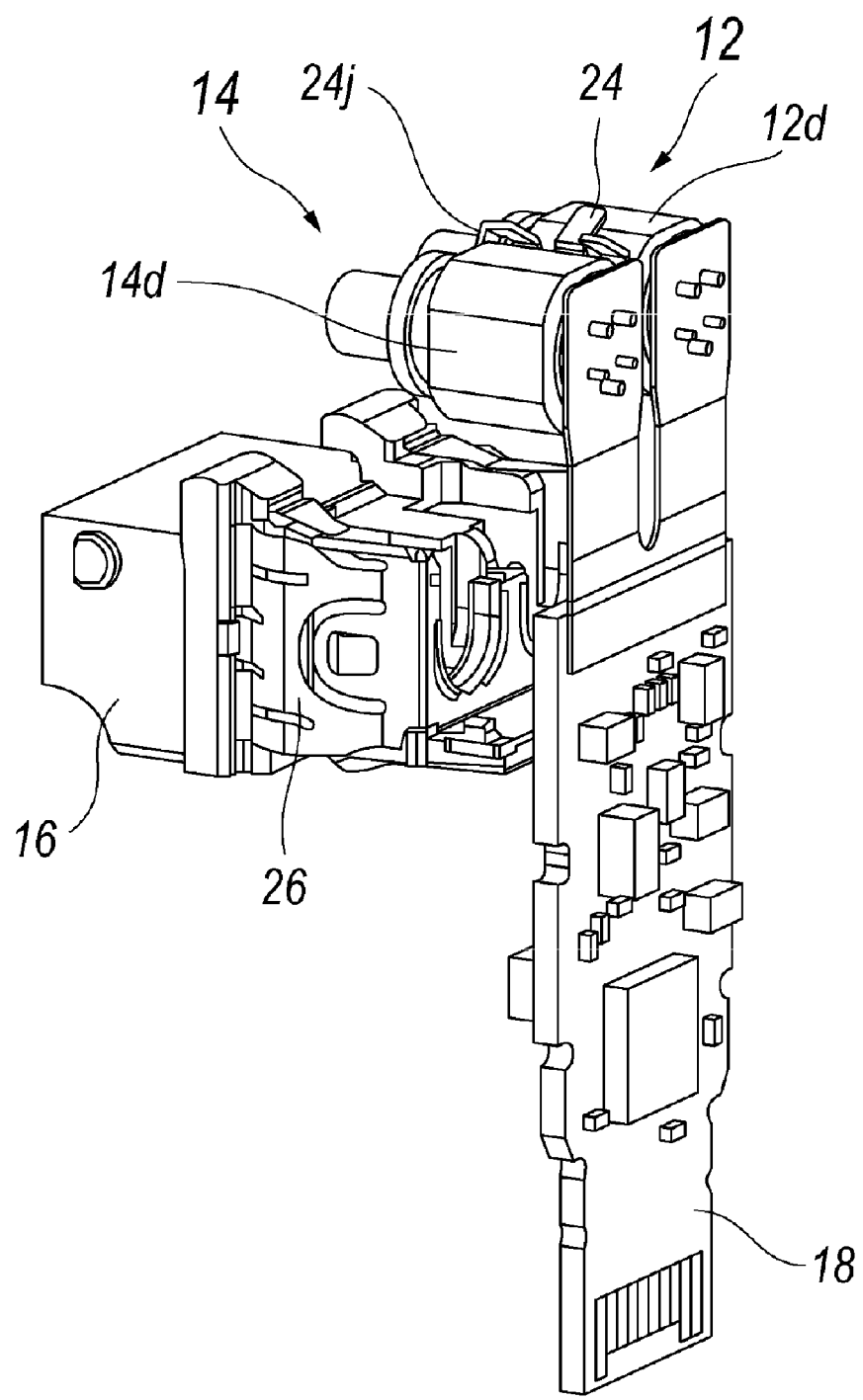
FIG. 11 shows a process to assemble the partition plate, which is subsequent to the process shown in FIG. 10.

The partition plate 24 may further have a tab 24j in one leg 24g. This tab makes a substantially right angle to the leg 24g. Referring to FIG. 11, this tab 24j operates as a stopper for the ROSA 24. That is, when the partition plate 24 is set between the TOSA 12 and the ROSA 14, the tab 24j comes in contact to the front surface of the skirt 14d, which determines the position of the partition plate 24 along the optical axis of the TOSA 12 and the ROSA 14.

According to the optical transceiver 10 thus described, the TOSA 12 and the ROSA 14 each has the flat surface, 12f and 14f, in the skirt portion thereof, 12d and 14d, which enables the TOSA 12 and the ROSA 14 to be arranged in side by side with a preset distance. Moreover, such an arrangement of the TOSA 12 and the ROSA 14 makes it possible to narrower the overall width of the optical transceiver 10. Diagonal portions between the flat surfaces in the skirt, 12d and 14d, secures the stiffness of the coupling member because it has a thicker wall compared with the flat surface portion. The partition plate 24 may prevent the TOSA 12 and the ROSA 14 from twisting in the transceiver because the overall width of two subassemblies, 12 and 14, added to the thickness of the partition plate 24 is substantially equal to the inner width of the frame 20. Moreover, because the partition plate 24 comes in physically contact with the frame 20 and the ground plate 26, which means that two subassemblies are each surrounded by electrically conductive members, the shielding efficiency may be enhanced and the crosstalk noise between two subassemblies may be decreased.

Next, a process to form the optical transceiver 10 having a structure explained above in detail will be described as referring to FIGS. 10 to 12.

Figure 10:
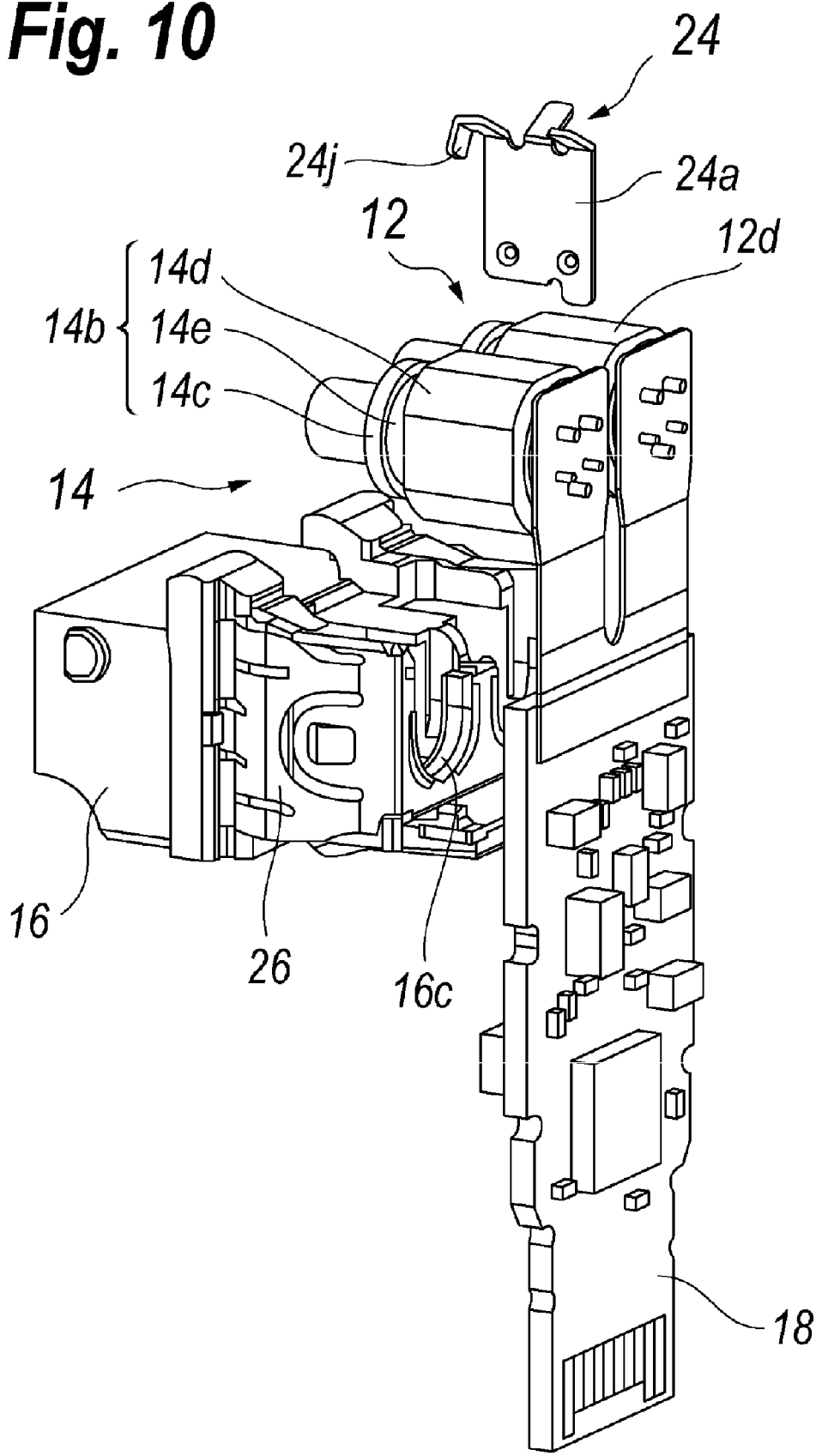
FIG. 10 shows a process to assemble the partition plate with the body of the optical transceiver.

First, as illustrated in FIG. 10, an intermediate product that includes the circuit board mounting the electronic circuits and connected to the TOSA 12 and the ROSA 14 with the flexible printed circuit board by the soldering; the optical receptacle 16 assembled with the ground finger 26; and the partition plate 24, are prepared.

Next, the partition plate 24 is set between the flat surfaces, 12f and 14f, of the skirt, 12d and 14d, of two subassemblies, 12 and 14. In this process, the tab 24j extending from one leg 24g abuts against the front surface of the skirt 14d of the ROSA 12, which aligns the partition plate 24 along the optical axis of the TOSA 12 and the ROSA 14. Subsequently, the TOSA 12, the ROSA 14 and the partition plate 24 are secured by a jig, which is not shown in FIG. 11.

Figure 12:
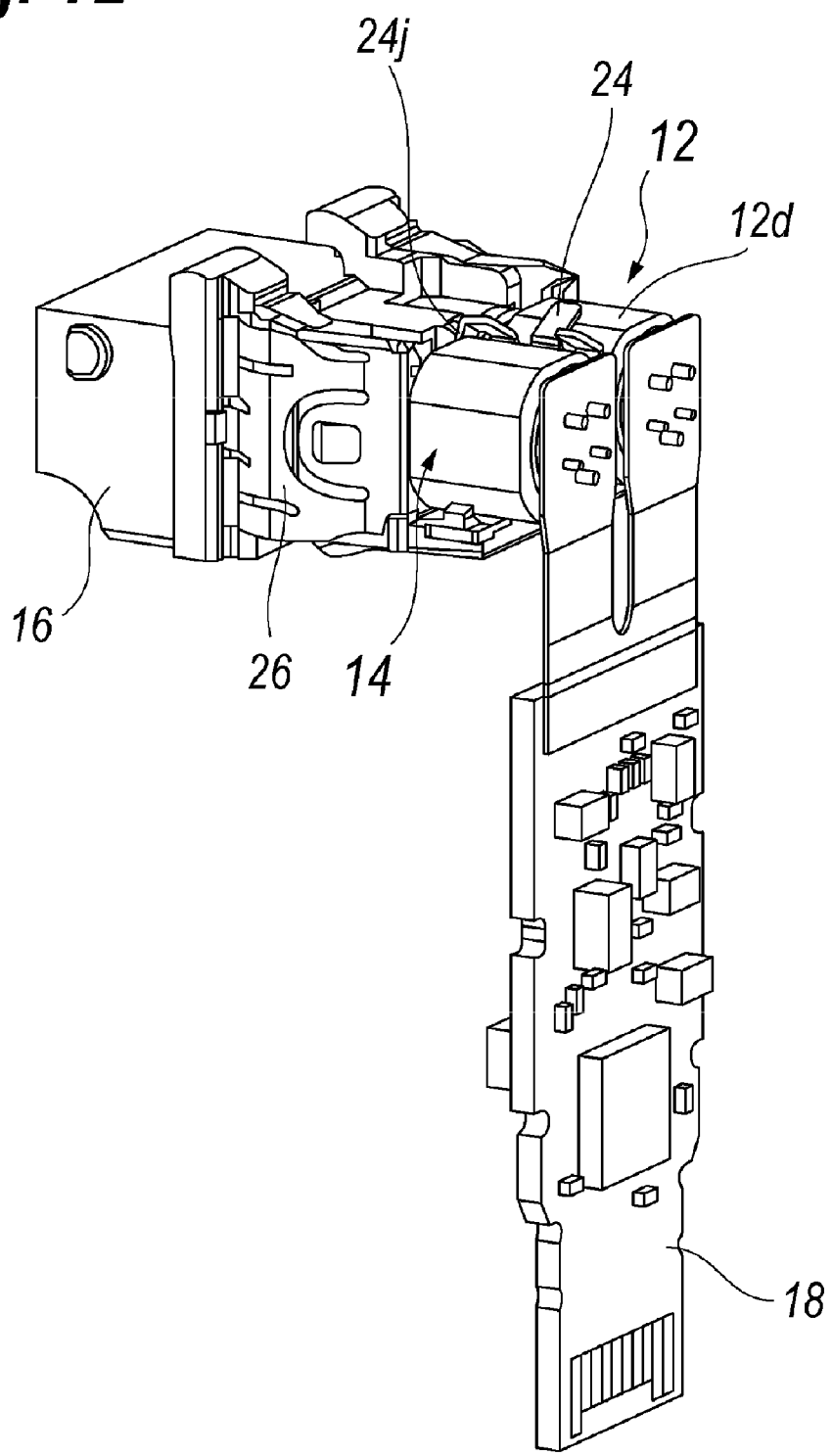
FIG. 12 shows a process to manufacture the optical transceiver according to the present invention, which is subsequent to that shown in FIG. 11.

Next, as illustrated in FIG. 12, the necks, 12e and 14e, of the TOSA 12 and the ROSA 14 are set on the saddle 16c of the optical receptacle 16 to assemble the intermediate product of the subassemblies connected to the circuit board 18 with the optical receptacle 16. Bending the flexible printed circuit boards, 18a and 18b, connecting the circuit board 18 to the subassemblies, 12 and 14, in a substantially right angle, engaging the frame 20 with the optical receptacle 16 as the sub-frame 28 holds the circuit board 18, putting the cover 22 from the rear, and engaging the cover 22 with the optical receptacle 16, the optical transceiver 10 according to the present embodiment is completed.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

I claim:

1. An optical transceiver, comprising:
 a transmitter optical subassembly (TOSA) and a receiver optical subassembly (ROSA) each having an optical device and an optical coupling member, said optical coupling member being made of resin and receiving said optical device, wherein said coupling member has a polygonal cross section with at least a pair of flat surfaces extending substantially in parallel, a frame made of metal plate, a circuit board mounted on said frame that mounts an electronic circuit coupled with said TOSA and said ROSA, and a partition plate made of metal, wherein said TOSA and said ROSA are arranged in side-by-side configuration where one of said flat surfaces of said TOSA faces said one of flat surfaces of said ROSA, and wherein said partition plate is put between said one of flat surfaces of said TOSA and said one of flat surfaces of said ROSA, and comes in physical contact with said frame.

2. The optical transceiver of claim 1, further comprising an optical receptacle assembled with an electrically conductive ground plate covering an outer shape of said optical receptacle, wherein said partition plate comes in physical contact with said ground plate.

3. The optical transceiver of claim 2, wherein said coupling member has a flange, a neck and a skirt, wherein said skirt has said polygonal cross section, and wherein said optical receptacle has a saddle where said neck of said coupling member is set thereon by being sandwiched with said flange and said skirt.

4. The optical transceiver of claim 2, wherein said optical receptacle has an eaves and said ground plate traces a cross section of said eaves, wherein said partition plate comes in physical contact with a tip of said eaves and a surface of said eaves to define a portion of said partition plate.

5. The optical transceiver of claim 1, wherein said pair of flat surfaces of said TOSA has a distance, and said pair of flat surfaces of said ROSA has another distance, and said partition plate has a thickness, and wherein a sum of said distance, said another distance and said thickness is substantially equal to or slightly smaller than a width of said optical transceiver.

6. The optical transceiver of claim 1, wherein said partition plate has a plurality of legs that are bent alternately and come in contact with said frame.

7. The optical transceiver of claim 1, wherein said partition plate has a projection, wherein one of said flat surfaces of said ROSA that faces one of said flat surfaces of said TOSA is put between said projection and said frame.

8. The optical transceiver of claim 1, wherein said coupling member has a skirt with said polygonal cross section and a bore in a center portion thereof to receive said optical device, wherein said skirt has a thickness in portions of said flat surfaces less than a thickness in portions except said flat surfaces.

* * * * *